United States Patent
Chen et al.

(10) Patent No.: US 10,670,793 B2
(45) Date of Patent: Jun. 2, 2020

(54) LIGHTING DEVICE WITH LIGHT GUIDE PLATE

(71) Applicant: XIAMEN ECO LIGHTING CO. LTD., Xiamen (CN)

(72) Inventors: Lingde Chen, Xiamen (CN); Weizhong Li, Xiamen (CN); Qiaorong Chen, Xiamen (CN); Xili Zheng, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 15/860,667

(22) Filed: Jan. 3, 2018

(65) Prior Publication Data
US 2018/0267226 A1    Sep. 20, 2018

(30) Foreign Application Priority Data

Mar. 16, 2017   (CN) ............... 2017 2 0255329 U

(51) Int. Cl.
| | | |
|---|---|---|
| *F21V 8/00* | (2006.01) | |
| *F21Y 115/10* | (2016.01) | |
| *F21S 8/04* | (2006.01) | |
| *F21Y 105/00* | (2016.01) | |

(52) U.S. Cl.
CPC .......... *G02B 6/0036* (2013.01); *G02B 6/003* (2013.01); *G02B 6/0055* (2013.01); *G02B 6/0065* (2013.01); *G02B 6/0068* (2013.01); *G02B 6/0073* (2013.01); *G02B 6/0078* (2013.01); *G02B 6/0083* (2013.01); *G02B 6/0088* (2013.01); *G02B 6/0091* (2013.01); *F21S 8/04* (2013.01); *F21Y 2105/00* (2013.01); *F21Y 2115/10* (2016.08)

(58) Field of Classification Search
CPC .... G02B 6/0036; G02B 6/003; G02B 6/0055; G02B 6/0068; G02B 6/0088; G02B 6/0073; G02B 6/0091; F21S 8/04
See application file for complete search history.

(56) References Cited

U.S. PATENT DOCUMENTS

| | | | | |
|---|---|---|---|---|
| 5,866,759 A * | 2/1999 | Jat | ...................... | A01K 67/0275 435/354 |
| 2010/0014317 A1* | 1/2010 | Liao | ...................... | G02B 6/0035 362/619 |
| 2012/0275190 A1* | 11/2012 | Matsumoto | .......... | G02B 6/0036 362/609 |
| 2015/0268404 A1* | 9/2015 | Chiu | .................... | G02B 6/0053 362/606 |

(Continued)

*Primary Examiner* — Anabel Ton
(74) *Attorney, Agent, or Firm* — Chun-Ming Shih; LanWay IPR Services

(57) ABSTRACT

A lighting device includes a light guide plate, a light source circuit, and a chassis. By conducting an extrusion process, the light guide plate may at least include a first light-guiding area and a second light-guiding area. The light source circuit faces toward an inlet of the light guide plate. When the light source circuit emits light beams toward the light guide plate, the first light-guiding area reflects the light beams toward a first light-guiding angle group, and the second light-guiding area reflects the light beams toward a second light-guiding angle group. The first light-guiding angle group is different from the second light-guiding angle group. The chassis is configured to fix the light guide plate and the light source circuit.

16 Claims, 11 Drawing Sheets

(56) References Cited

U.S. PATENT DOCUMENTS

2015/0316699 A1* 11/2015 Shimizu ............... G02B 6/0043
                                                        348/790
2016/0313494 A1* 10/2016 Hamilton ............. G02B 6/0068
2016/0381317 A1* 12/2016 Hosoki ................. G02B 6/009
                                                         349/65

* cited by examiner

LIGHTING DEVICE WITH LIGHT GUIDE PLATE

FIELD OF THE INVENTION

The present invention relates to a lighting device, and more particularly to a lighting device with a light guide plate.

BACKGROUND OF THE INVENTION

Green industry has been the main trend over the world, and performance of light emitting diodes (LEDs) has been greatly improved. As such, the LEDs are expected to replace incandescent bulbs and fluorescent tubes, which have low performance and may result in mercury pollution respectively. The LEDs may be widely adopted in many areas when comparing with the incandescent bulbs and the fluorescent tubes.

With respect to plane lighting structure, the incandescent bulbs may be directly replaced by the LEDs, which may reduce costs. However, if the optical design is not modified correspondingly, the performance of the LEDs may be reduced. In another aspect, LED point light sources may be adopted, which is commonly used in the plane lighting structure. That is, a direct-type light source configuration and a diffuser plate may be adopted. The LED point light source may have attributes, such as low cost and lighter weight, through a plurality of LEDs having low performance need to be used. In addition, the plane lighting structure may further include a light guide plate. For example, plane light devices which may have LED side-lighting configurations with the light guide plate. When light beams are transmitted to the light guide plate, the total reflection of the light beams may be destroyed and directions of the light beams may be changed by particular structures configured on the bottom of the light guide plate. As such, the plane light device may be suitable for indoor-lighting, and have attributes, such as the number of the light source may be reduced, the thickness of the plane lighting structure may be reduced, and visual experience may not be much impacted when a single LED light source is failure. However, the light guide plate is heavy, and may generate hygroscopic and etiolated problems when adopting for outdoor-lighting.

When the plane guide plate is installed on the ceiling, dark areas may be generated on walls and corners, and additional spotlights are required to make up the brightness of the dark area. This problem may occur in offices, shopping malls, classrooms, and libraries. The conventional solution for this problem may result in a mess of arrangement of the lighting device and different lighting devices need to be used cooperatively, which may reduce the cleanness of the space.

SUMMARY OF THE INVENTION

Currently, light guide plates have been widely adopted. Principles of light guide plates are originated from liquid crystal screens of laptops. The light guide plate is configured to transform a line light source into a surface light source. When light beams are emitted toward the light guide plate, the light beams emitted from a light source may be transmitted to a remote end of the light guide plate by total reflection. During the transmission of the light beams, the light beams may contact diffusion points configured on a bottom of the of the light guide plate, and the light beams may be reflected to different angles. The total reflection may be destroyed by the diffusion points, and the light beams may be transmitted to a front of the light guide plate.

The light guide plate may be manufactured by spectral analysis principles, laser engraving, or digital printing technology under a constant-temperature, constant-humidity, and non-dust condition. The light guide plate may have attributes, such as high light conversion rate (30% higher than conventional plates), uniform light-guiding ability, ultra-thin, ultra-bright, low energy-consuming, environmental protective, high durability, suitable for both indoor and outdoor, hard to etiolate, and easy to install and maintain.

The present invention relates to a light guide plate configured to control reflection angles of the light beams, and a focus projection type lighting and a scattered type lighting may be cooperatively operated within a lighting device, so as to achieve a maximum performance, to unify types of the lighting devices on a ceiling, to improve cleanness of the ceiling, and to optimize the light guide plate.

The present invention relates to a lighting device, including a light guide plate including a first light-guiding area and a second light-guiding area formed by at least one extrusion process; a light source circuit configured toward an inlet of the light guide plate; a chassis configured to fix the light guide plate and the light source circuit; a light source circuit facing toward an inlet of the light guide plate; a chassis configured to fix the light guide plate and the light source circuit; wherein when the light source circuit emits light beams toward the light guide plate, the first light-guiding area reflects the light beams toward a first light-guiding angle group, and the second light-guiding area reflects the light beams toward a second light-guiding angle group; the first light-guiding angle group is different from the second light-guiding angle group. For example, the first light-guiding angle group may guide the light beams to a narrow-lighting area to form a beam-type focus lighting, and the second light-guiding angle group may scatter the light beams to form the scattered type lighting. The chassis is configured to fix the light guide plate and the light source circuit.

The lighting device may include the light guide plates, wherein the light guide plates are of Sheet-shaped and is made by plastic materials. A plurality of stereoscopic structures is configured on a bottom surface of the light guide plate by the extrusion process. The light source circuits may emit the light beams toward sidewalls of the light guide plates. The light beams may be transmitted to a remote side of the light guide plate. The stereoscopic structures may guide the light beams toward the first light-guiding angle group and the second light-guiding angle group respectively. In one example, the light guide plates may be made of polystyrene (PS), polycarbonate (PC), or polymethyl methacrylate.

The stereoscopic structures may strip-shaped lens or may be micro-lens arranged in a high density.

The first light-guiding angle area is configured to be a focus projection type, and the first light-guiding angle area is configured to irritate the light beams toward a predetermined projection area along the same direction to form a focus projection type lighting. The focus projection lighting is suitable for highlighting paintings or improving atmosphere of dining table. The second light-guiding angle group is configured to scatter the light beams, which may have different directions, to form a scattered type lighting suitable for lighting in a wide range.

In one example, the first light-guiding area is configured to be at a central area of the light guide plate, and the second light-guiding area is configured to be a rim of the light guide plate. As such, items which need to be emphasized on may be placed under the lighting device. The first light-guiding area may emit a focused light beam projecting on the emphasized items. The second light-guiding area may emit a soft and scattered light beams to improve ambient brightness around the emphasized items. So as to form a progressive lighting ambient.

In one example, the lighting device may further include a disassembly structure. The disassembly structure may be, for example, a buckle connection, a latch connection, a screw connection, a hook or a magnet connection. As such, users may assemble or disassemble the light guide plate having different first light-guiding area and the second light-guiding area depending on demands.

In one example, the lighting device may further include an optical component is configured between the light source circuit and the light guide plate. The optical component is configured to uniformly guide the light beams emitted from the light source circuit to the light guide plate. In one example, the optical component may be a plastic lens. One side of the plastic lens faces toward a plurality of LED components of the light source circuit, and the other side of the plastic lens faces toward the sidewall of the light-guiding plate. In another example, the optical component may be a glass lens or other transparent materials.

In one example, the lighting device may further include a metal frame configured to surround each of the components of the lighting device on the light guide plate.

In one example, the light guide plate may include at least two portions configured to project the light beams via at least two sidewalls of the light guide plate respectively.

In one example, the light guide plate may further include a second light source circuit. The second light source circuit is configured on a top of the light guide plate, and is configured to emit the light beams to the bottom of the light guide plate.

In one example, the lighting device may include at least one component cooperatively operate with the light guide plate and the light source circuit. For example, one light guide plate and one light source circuit may be cooperatively operated, and are configured to be as the component. The lighting device may include a plurality of the components to enlarge a lighting range.

In one example, a fixing structure is configured on the light guide plate to fix the light source circuit.

In one example, the lighting device may further include a back plate chassis configured to fix the light source circuit and the light guide plate to form a ceiling lighting device. The ceiling lighting device may include a flat bottom configured to attach to the ceiling when installing. As such, the ceiling lighting device may be directly and firmly installed on the ceiling, and may have attributes, such as easy to install and simple style, which is suitable for families and offices.

In another example, the light-guiding angle group of the first-light area may be asymmetric angles. The users may adjust a direction of the lighting device to adjust light-emitting angles of the lighting device.

DETAILED DESCRIPTION

Principles of light guide plates are originated from liquid crystal screens of laptops. The light guide plate is configured to transform a line light source into a surface light source. When light beams are emitted toward the light guide plate, the light beams emitted from a light source may be transmitted to a remote side of the light guide plate by total reflection. During the transmission of the light beams, the light beams may contact diffusion points configured on a bottom of the of the light guide plate, and the light beams may be reflected to different angles. The total reflection may be destroyed by the diffusion points, and the light beams may be transmitted to a front of the light guide plate. Wherein the diffusion points may be in different sizes and densities. Lighting type and brightness may be adjusted by changing configurations of the diffusion points.

The light guide plate may be manufactured by spectral analysis principles, laser engraving, or digital printing technology under a constant-temperature, constant-humidity, and non-dust condition. The light guide plate may have attributes, such as high light conversion rate (30% higher than conventional plates), uniform light-guiding ability, ultra-thin, ultra-bright, low energy-consuming, environmental protective, high durability, suitable for both indoor and outdoor, hard to etiolate, and easy to install and maintain.

The present invention relates to a light guide plate configured to control reflection angles of the light beams, and a focus projection type lighting and a scattered type lighting may be cooperatively operated within a lighting device, so as to achieve a maximum performance, to unify types of the lighting devices on a ceiling, to improve cleanness of the ceiling, and to optimize the light guide plate.

Figure 1:
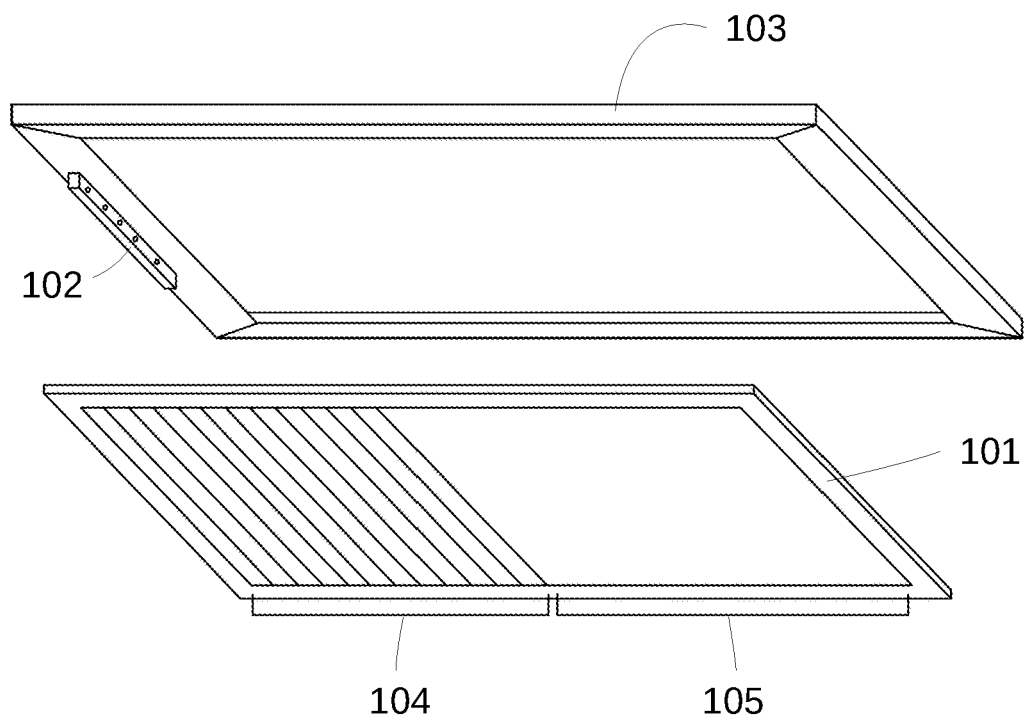
FIG. 1 is a schematic view of a lighting device in accordance with a first embodiment of the present invention.

Referring to FIG. 1, the present invention relates to the lighting device, including: the light guide plate 101, a light source circuit 102, and a chassis 103. The light guide plate 101 may be manufactured by an extrusion process. The light guide plate 101 may at least include a first light-guiding area 104 and a second light-guiding area 105. The light source circuit 102 faces toward an inlet of the light guide plate 101. When the light source circuit 102 emits the light beams toward the light guide plate 101, the first light-guiding area 104 may reflect the light beams toward a first light-guiding angle group, and the second light-guiding area 105 may reflect the light beams toward a second light-guiding angle group. The first light-guiding angle group is different from the second light-guiding angle group, and may be adjusted depending on demands. For example, the first light-guiding angle group may guide the light beams to a narrow-lighting area to form a beam-type focus lighting, and the second light-guiding angle group may scatter the light beams to form the scattered type lighting. The chassis is configured to fix the light guide plate and the light source circuit.

The extrusion process is a plastic-molding manufacturing process for manufacturing, such as, pipes, straws, curtain tracks, sticks, and fibers, and the extrusion process is one of main manufacturing processes of thermoplastic molding. The principle of the extrusion process is to heat and melt granular polymer raw material into a viscous state, and to form continuous objects via an extrusion die when conducting pressure. Wherein a cross-section of the continuous objects is similar to a shape of the extrusion die, and the cross-section of the continuous objects may depend on the shape of the extrusion die, such as T-shape, U-shape, rectangle, or circle. Tube objects extruded from the extrusion die may be transformed into a glass state by conducting a cooling process. Plastic products with a certain shape and size are obtained by conducting a cutting process. The extrusion process is similar to an injection molding process. However, the extrusion process is more suitable for manufacturing long and continuous-shaped products, and costs of the extrusion process is lower than the injection molding process. As such, the extrusion process is more suitable for manufacturing thermoplastics and artificial rubbers, such as window frames, door frames, thin plate, thin film and fiber.

In one example, the light source circuit 102 may be one light emitting diode (LED) chip or a light source component including a plurality of the LEDs. Wherein the LED may be made of compounds, such as Ga, As, P, and N. The LED is a semiconductor diode configured to transform electric energy into light. The LED may include a PN-junction, which is the same with a regular diode, having unidirectional conductivity When a positive voltage is conducted on the LED, electric holes injected from a P-zone to an N-zone and electrons injected from the N-zone to the P-zone may be recombined with the electrons within the N-zone and the electric holes within the P-zone respectively in an area located at a few microns near the PN-junction to generate spontaneous radiation fluorescence. The electrons and the electric holes in different semiconductor materials may occupy different energy states, and may generate different amount of energy when recombining. The more amount of the energy is generated, the shorter wavelength of the light may be emitted. For example, the diode made of gallium arsenide may emit red light, the diode made of phosphide gallium may emit green light, the diode made of silicon carbide may emit yellow light, and the diode made of gallium nitride may emit blue light.

Figure 2:
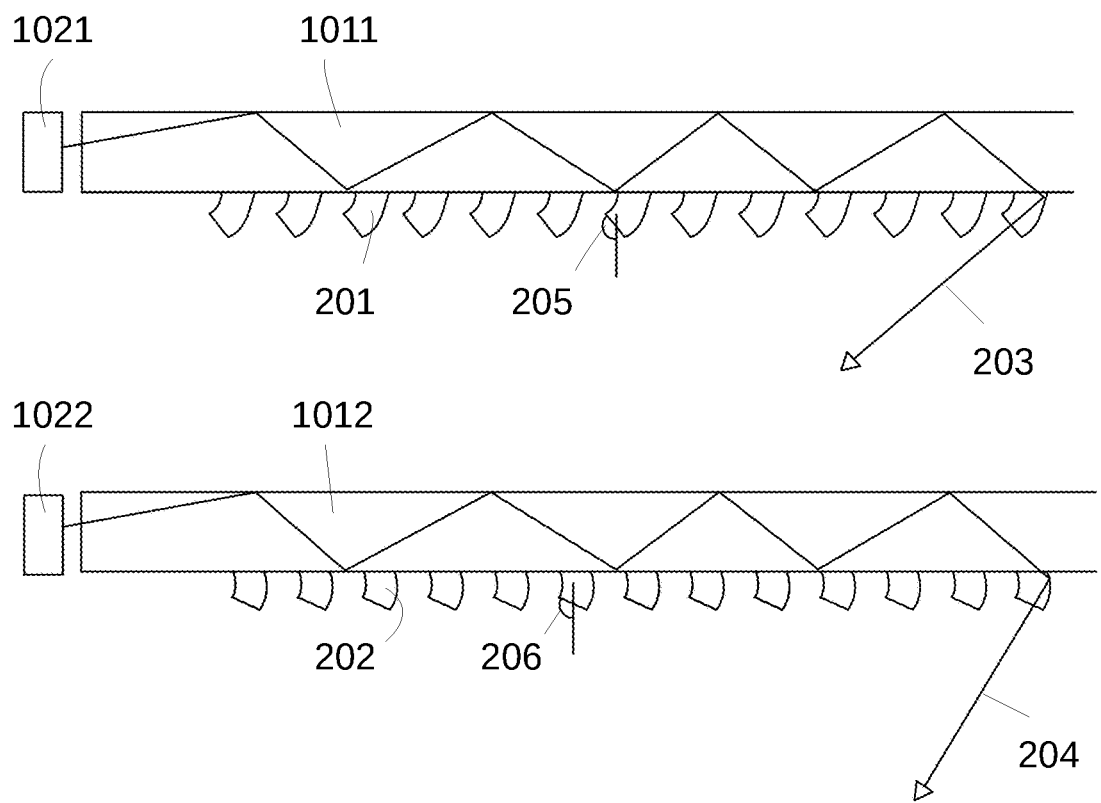
FIG. 2 is a schematic view of a surface of a light guide plate in accordance with a second embodiment of the present invention.

Referring to FIG. 2, the lighting device may include the light guide plates 1011, 1012, wherein the light guide plates 1011, 1012 are of Sheet-shaped and is made by plastic materials. A plurality of stereoscopic structures 201, 202 is configured on a bottom surface of the light guide plate by the extrusion process. The light source circuits 1021, 1022 may emit the light beams toward sidewalls of the light guide plates 1011, 1012. The light beams 203, 204 may be transmitted to a remote side of the light guide plate 1011, 1012. The stereoscopic structures 201, 202 may guide the light beams 203, 204 toward the first light-guiding angle group 205 and the second light-guiding angle group 206 respectively. In one example, the light guide plates 1011, 1012 may be made of polystyrene (PS), polycarbonate (PC), or polymethyl methacrylate.

Referring to FIG. 2, in another example, the stereoscopic structures 201, 202 are configured on the bottom of the light guide plate 1011, 1012. The stereoscopic structures 201, 202 may be in different shapes, different sizes, and different configurations. For example, the stereoscopic structures 201, 202 may be protrusions with a certain angle. Specifically, the stereoscopic structures 201, 202 may be strip-shaped lens or may be micro-lens arranged in a high density.

Figure 3:
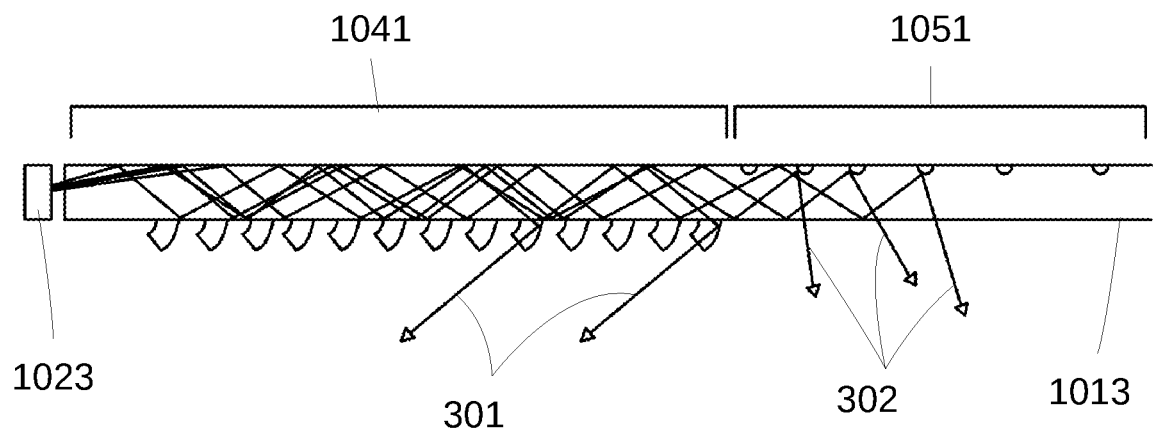
FIG. 3 is a schematic view of the light guide plate in accordance with a third embodiment of the present invention.

Referring to FIG. 3, the light guide plate 1013 may include the first light-guiding area 1041 and the second light-guiding area 1051. The light source circuit 1023 faces toward the inlet of the light guide plate 1013. When the light source circuit 1023 emits the light beams toward the light guide plate 1013, the first light-guiding area 1041 may reflect the light beams toward the first light-guiding angle group, and the second light-guiding area 1051 may reflect the light beams toward the second light-guiding angle group. The first light-guiding angle group is different from the second light-guiding angle group. The first light-guiding angle area 1041 is configured to be a focus projection type, and the first light-guiding angle area 1041 is configured to irritate the light beams 301 toward a predetermined projection area along the same direction to form the focus projection type lighting. The focus projection lighting is suitable for highlighting paintings or improving atmosphere of dining table. The second light-guiding angle group 1051 is configured to scatter the light beams 302 to form a scattered type lighting suitable for lighting in a wide range.

Figure 4:
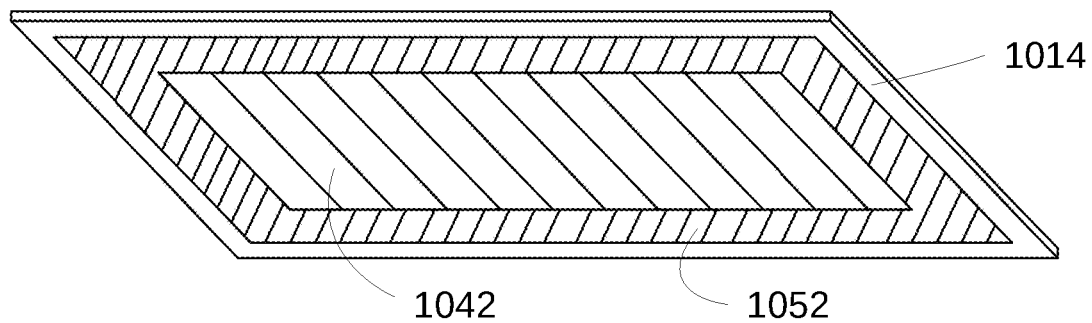
FIG. 4 is a schematic view of the light guide plate in accordance with a fourth embodiment of the present invention.

In one example, referring to FIG. 4, the lighting device may include the light guide plate 1014. The first light-guiding area 1042 is configured to be at a central area of the light guide plate 1014, and the second light-guiding area 1052 is configured to be a rim of the light guide plate 1014. The light-guiding angle group of the first light-guiding area 1042 is different from that of the second light-guiding area 1052. As such, items which need to be emphasized on may be placed under the lighting device. The first light-guiding area 1042 may emit a focused light beams on the emphasized items. The second light-guiding area 1052 may emit a soft and scattered light beams to improve ambient brightness around the emphasized items. So as to form a progressive lighting ambient.

In one example, the lighting device may further include a disassembly structure. The disassembly structure may be, for example, a buckle connection, a latch connection, a screw connection, a hook or a magnet connection. The buckle connection is configured to embed or to fix one element to the other element. The buckle connection is often adopted for connecting plastic elements, wherein the plastic element may have certain flexibility. Features of the buckle connection are, such as easy to assemble and easy to disassemble, and may be disassemble without tools. As such, users may assemble and disassemble the light guide plate having different first light-guiding area and second light-guiding area depending on demands.

Figure 5:
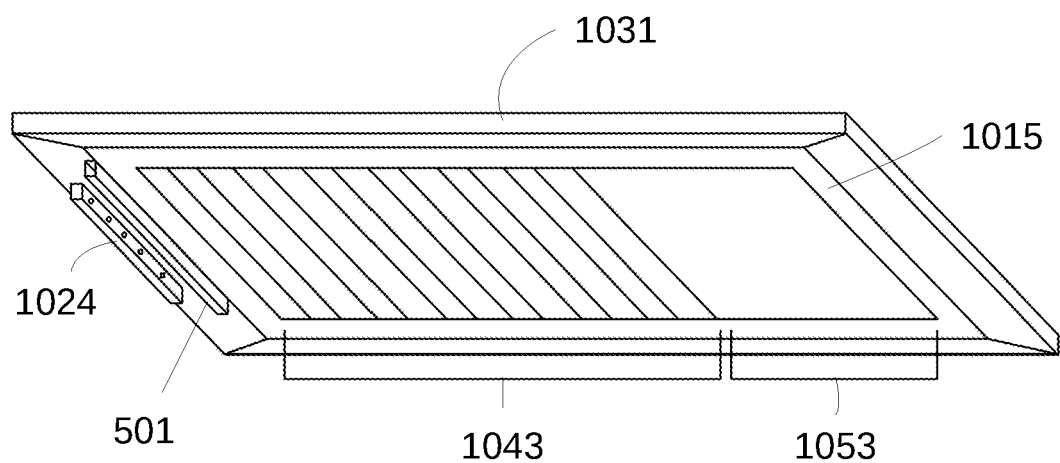
FIG. 5 is a schematic view of a lighting device having an optical component in accordance with a fifth embodiment of the present invention.

In one example, referring to FIG. 5, the lighting device may include the light guide plate 1015, the light source circuit 1024, an optical component 501, and the chassis 1031. The light guide plate 1015 may be manufactured by the extrusion process. The light guide plate 1015 may at least include the first light-guiding area 1043 and the second light-guiding area 1053. The light source circuit 1024 faces toward the inlet of the light guide plate 1015. The optical component 501 is configured between the light source circuit 1024 and the light guide plate 1015. The optical component 501 is configured to uniformly guide the light beams emitted from the light source circuit 1024 to the light guide plate 1015. When the light source circuit 1024 emits the light beams toward the light guide plate 1015, the light beams may pass through the optical component 501 and may be guided toward the light guide plate 1015. The first light-guiding area 1043 of the light guide plate 1015 may reflect the light beams toward the first light-guiding angle group, and the second light-guiding area 1053 of the light guide plate 1015 may reflect the light beams toward the second light-guiding angle group. The first light-guiding angle group is different from the second light-guiding angle group, and the first light-guiding angle group and the second light-guiding angle group may be adjusted depending on the demands. The chassis 1031 is configured to fix the light source circuit 1024, the optical component 501, and the light guide plate 1015. In one example, the optical component 501 may be a plastic lens. One side of the plastic lens faces toward a plurality of LED components of the light source circuit 1024, and the other side of the plastic lens faces toward the sidewall of the light-guiding plate 1015. In another example, the optical component 501 may be a glass lens or other transparent materials.

In one example, the lighting device may further include a reflective component configured on one side of the light guide plate. The reflective component is configured to reflect the light beams irradiating on the reflective component back to the light guide plate, and the light beams are emitted to the other side of the light guide plate. The reflective component is configured to be a reflective coating layer coated on the light guide plate.

In one example, the lighting device may further include a metal frame configured to surround each of the components of the lighting device on the light guide plate.

Figure 6:
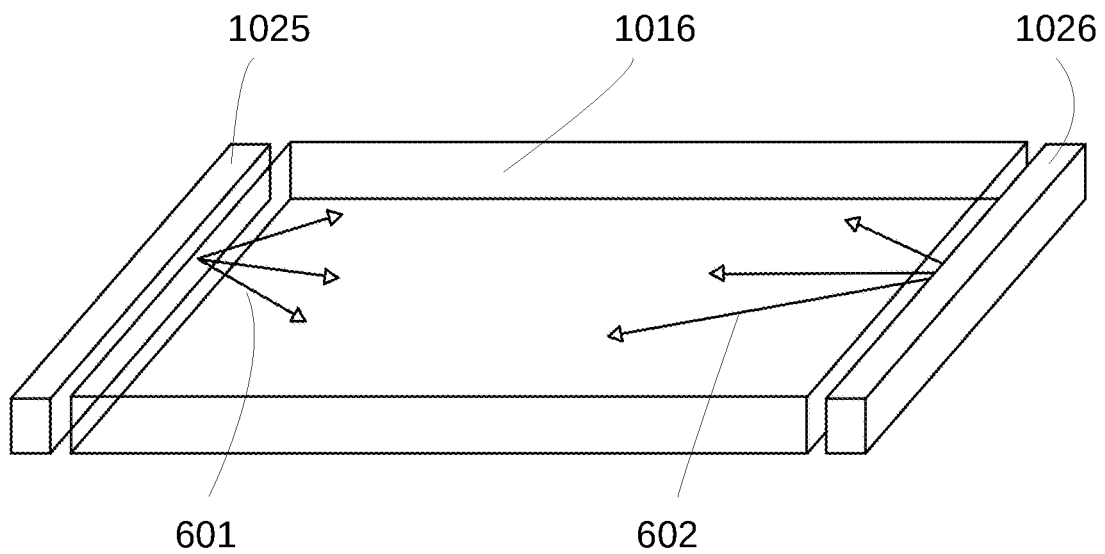
FIG. 6 is a schematic view of a lighting device having two light source circuit in accordance with a sixth embodiment of the present invention.

In one example, referring to FIG. 6, the lighting device may include the light guide plate 1016. The light guide plate 1016 may include at least two light source circuits 1025, 1026. The light source circuits 1025, 1026 respectively emits the light beams 601, 602 toward the at least two sidewalls of the light guide plate 1016.

Figure 7:
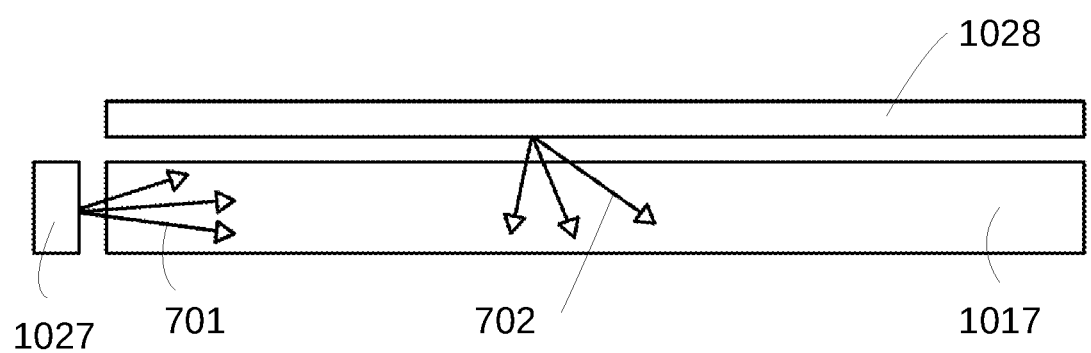
FIG. 7 is a side view of the lighting device having the two light source circuit in accordance with a seventh embodiment of the present invention.

In one example, referring to FIG. 7, the lighting device may include the light guide plate 1017. The light guide plate 1017 may include a first light source circuit 1027 and a second light source circuit 1028. The first light source 1027 is configured on the sidewall of the light guide plate 1017, and is configured to project the light beams 701 toward the sidewall of the light guide plate 1017. The second light source circuit 1028 is configured on a top of the light guide plate 1017. and is configured to project the light beams 702 toward a top-surface of the light plate 1017. The light beams emitted from the second light source circuit 1028 may pass through the light guide plate 1017, and may be emitted to the bottom of the light guide plate 1017.

Figure 8:
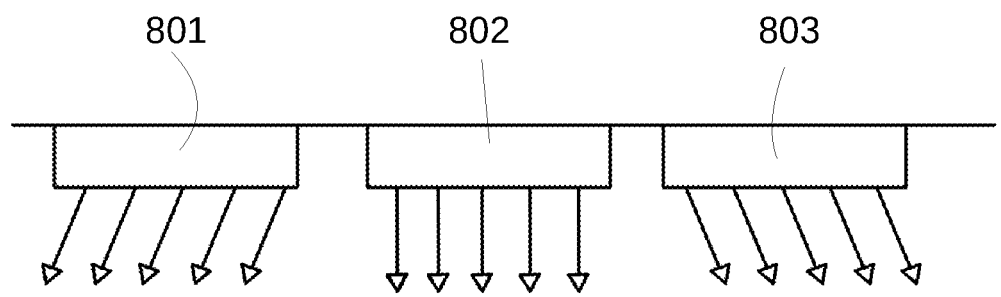
FIG. 8 is a schematic view of a plurality of lighting devices in accordance with an eighth embodiment of the present invention.

In one example, referring to FIG. 8, the lighting device may include at least one component cooperatively operate with the light guide plate and the light source circuit. For example, one light guide plate and one light source circuit may be cooperatively operated, and are configured to be as the component. The lighting device may include a plurality of the components 801, 802, 803 to enlarge a lighting range.

Figure 9:
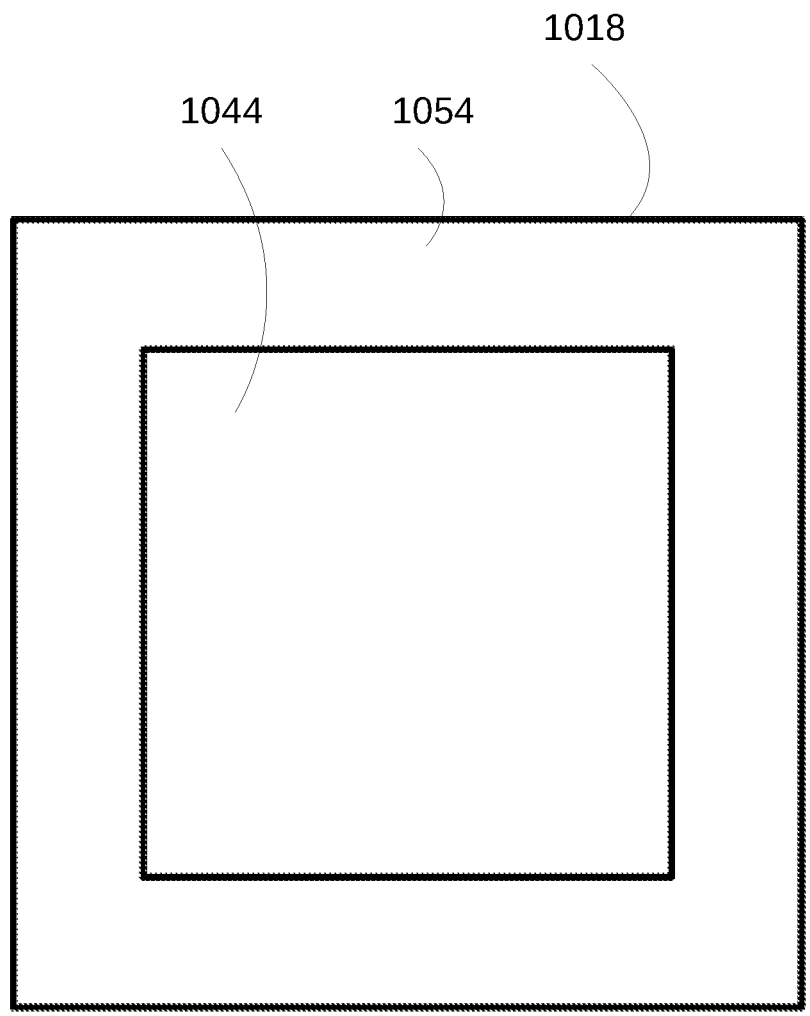
FIG. 9 is a schematic view of a light guide plate in accordance with a ninth embodiment of the present invention.

The light guide plate may be in different shape, such as, rectangle, T-shape, U shape, square, and circle. In one example, referring to FIG. 9, the light guide plate 1018 may be of a squared. The light guide plate 1018 may include the first light-guiding area 1044 and the second light-guiding area 1054. The first light-guiding area 1044 is configured to be at the central area of the light guide plate 1018, and the second light-guiding area 1054 is configured to be the rim of the light guide plate 1018. The light-guiding angle group of the first light-guiding area 1044 is different from that of the second light-guiding area 1054.

Figure 10:
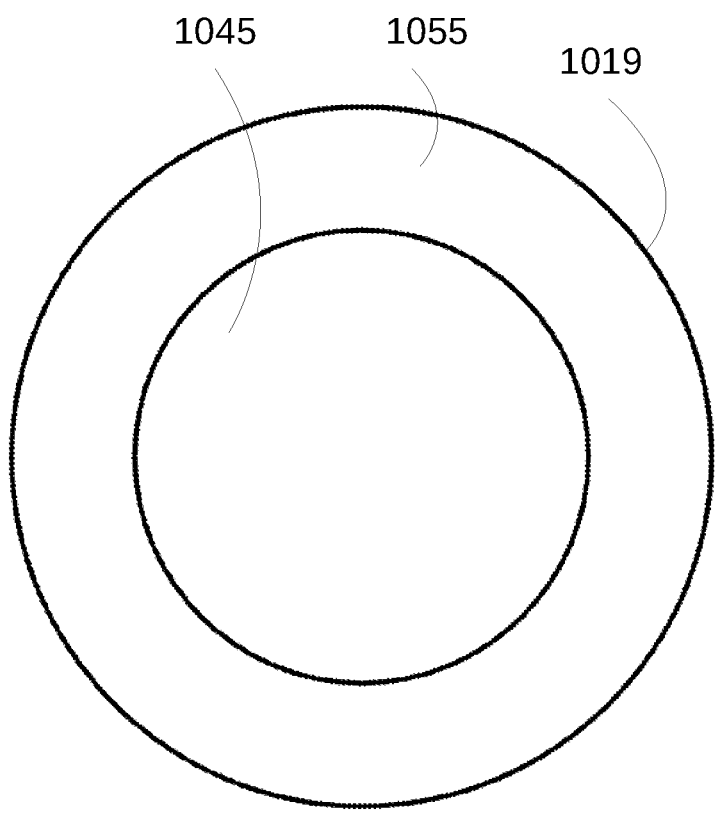
FIG. 10 is a schematic view of a light guide plate in accordance with a tenth embodiment of the present invention.

In another example, as shown in FIG. 10, the light guide plate 1019 may be of a circle. The light guide plate 1019 may include the first light-guiding area 1045 and the second light-guiding area 1055. The first light-guiding area 1045 is configured to be at the central area of the light guide plate 1019, and the second light-guiding area 1055 is configured to be the rim of the light guide plate 1019. The light-guiding angle group of the first light-guiding area 1045 is different from the light-guiding angle group of the second light-guiding area 1055.

Figure 11:
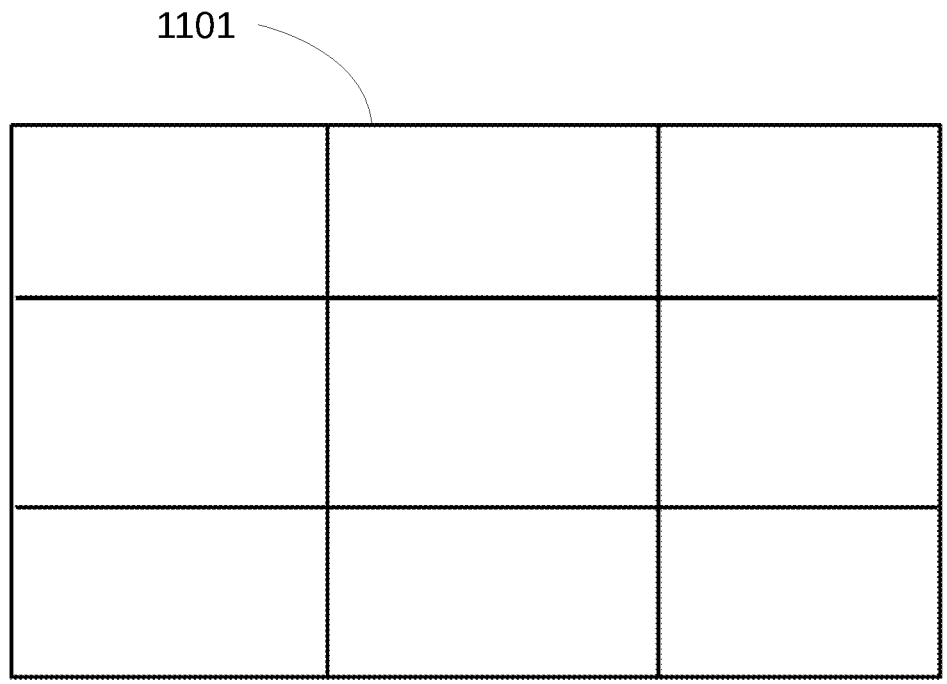
FIG. 11 is a schematic view of a light guide plate in accordance with an eleventh embodiment of the present invention.

In one example, as shown in FIG. 11, the light guide plate 1101 may include nine light-guiding areas, and each of the light-guiding areas respectively has different light-guiding angle groups to form a plurality of combinations of light paths.

In one example, the light guide plate is assembled by a plurality of sub-light-guiding plates. Each of the sub-light-guiding plates has different light-guiding angle groups. The sub-light-guiding plates are fixed by a splicing structure.

In one example, a fixing structure is configured on the light guide plate to fix the light source circuit. As such, the light source circuit may be integral with the light guide plate.

In one example, the lighting device may further include a backward plate chassis configured to fix the light source circuit and the light guide plate to form a ceiling lighting device. The ceiling lighting device may include a flat bottom configured to attach to the ceiling firmly when installing. As such, the ceiling lighting device may be directly and firmly installed on the ceiling, and may have attributes, such as easy to install and simple style, which is suitable for families and offices.

In another example, the lighting device may have a rotating structure configured to provide the users to adjust an installation angle when installing. The light-guiding angle group of the first-light area may be asymmetric angles. The users may adjust a direction of the lighting device to adjust light-emitting angles of the lighting device.

In addition to the above examples, other modifications and variations are intended to be within the scope of the present invention as defined by the appended claims.

The invention claimed is:

1. A lighting device, comprising:
    a light guide plate, comprising a first light-guiding area and a second light-guiding area formed by at least one extrusion process;
    a light source circuit, facing toward an inlet of the light guide plate;
    a chassis, configured to fix the light guide plate and the light source circuit;
    wherein the light source circuit emits light beams toward the light guide plate, the first light-guiding area reflects the light beams toward a first light-guiding angle group, and the second light-guiding area reflects the light beams toward a second light-guiding angle group; and
    wherein the first light-guiding angle group is different from the second light-guiding angle group, further comprising a second light source circuit configured on a top of the light guide plate, and the light beams emitted from the second light source circuit being transmitted to a bottom surface of the light guide plate.

2. The lighting device according to claim 1, wherein the light guide plate is sheet-shaped and is made by plastic materials, a plurality of stereoscopic structures configured on a bottom surface of the light guide plate by the extrusion process, the light beams are emitted from the light source circuit toward sidewalls of the light guiding plate, and the stereoscopic structures guide the light beams toward the first light-guiding angle group and the second light-guiding angle group.

3. The lighting device according to claim 2, wherein the stereoscopic structures are strip-shaped lens.

4. The lighting device according to claim 2, wherein the stereoscopic structures are configured to be micro-lens arranged in a high density.

5. The lighting device according to claim 1, wherein the first light-guiding angle group are configured to be a focus projection type, and the light beams are guided to irradiate to a predetermined projection area, and the second light-guiding angle group are configured to be a scattered type, and the light beams are scattered.

6. The lighting device according to claim 1, wherein the first light-guiding area is configured to be at a central area of the light guide plate, and the second light-guiding area is configured to be a rim of the light guide plate.

7. The lighting device according to claim 1, wherein the lighting device further comprises an optical component configured between the light source circuit and the light guide plate, and the optical component is configured to uniformly guide the light beams emitted from the light source circuit to the light guide plate.

8. The lighting device according to claim 7, wherein the optical component is a plastic lens, one side of the plastic lens faces toward a plurality of diode components of the light source circuit, and the other side of the plastic lens faces toward the sidewall of the light-guiding plate.

9. The lighting device according to claim 1, wherein the lighting device further comprises a reflective component configured on one side of the light guide plate, the reflective component is configured to reflect the light beams irradiating on the reflective component back to the light guide plate, and the light beams are emitted to the other side of the light guide plate.

10. The lighting device according to claim 9, wherein the reflective component is configured to be a reflective coating layer coated on the light guide plate.

11. The lighting device according to claim 1, wherein the lighting device further comprises a metal frame configured to surround the light guide plate.

12. The lighting device according to claim 1, wherein the light source circuit comprises at least two portions configured to project the light beams via least two sidewalls of the light guide plate respectively.

13. The lighting device according to claim 1, further comprising a second light source circuit configured on a top of the light guide plate, and the light beams emitted from the second light source circuit being transmitted to a bottom surface of the light guide plate.

14. The lighting device according to claim 1, further comprising a plurality of components cooperatively operated with the light guide plate and the light source circuit.

15. The lighting device according to claim 1, wherein the lighting device further comprises a splicing structure configured to assemble the sub-light-guide-plates.

16. The lighting device according to claim 1, wherein a fixing structure is configured on the light guide plate to fix the light source circuit.

* * * * *